(No Model.)
P. MEISSNER.
SUSPENDING DEVICE FOR HORSE BOOTS, &c.
No. 601,974. Patented Apr. 5, 1898.
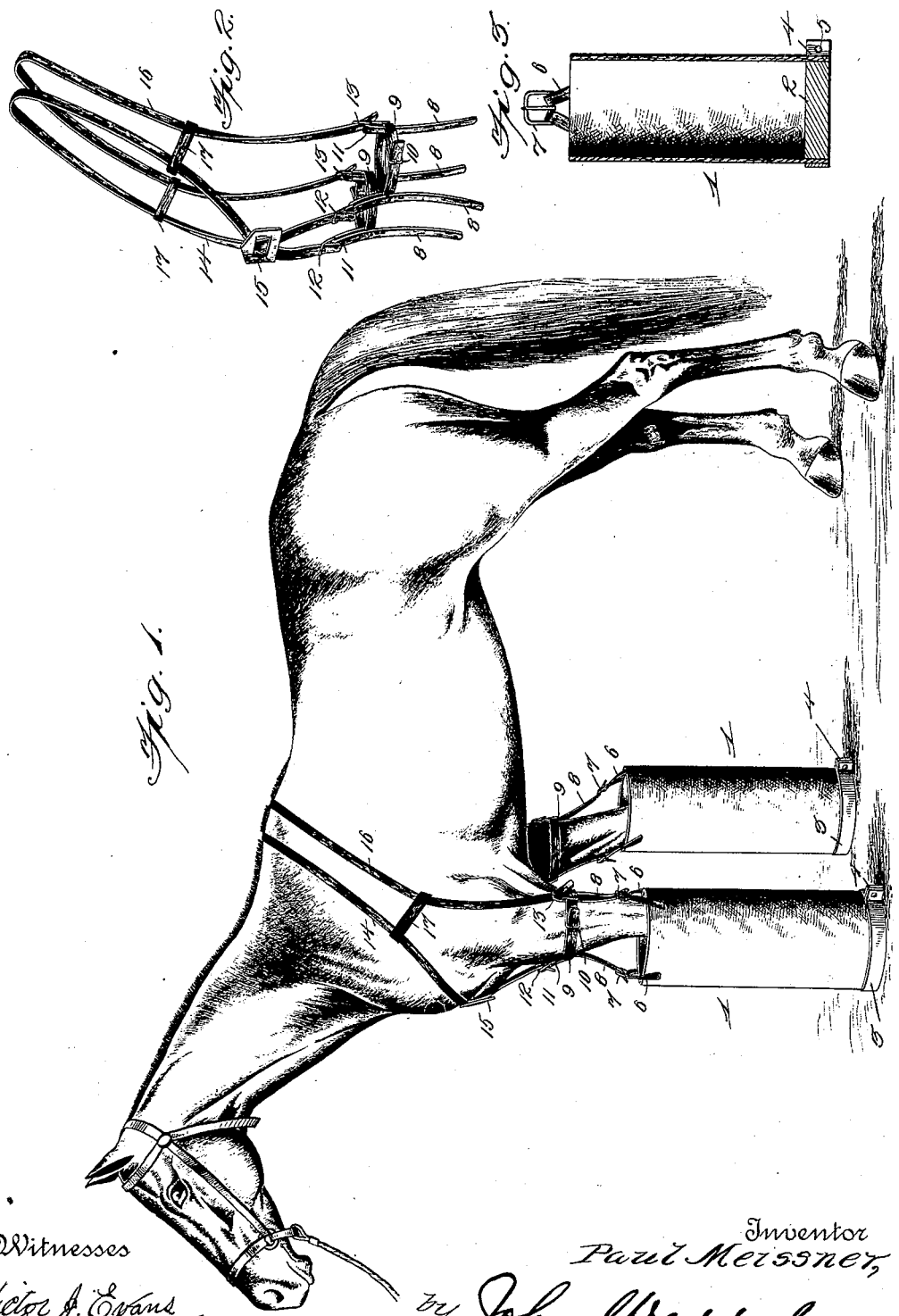
Witnesses
Victor J. Evans
E. J. Koerth
Inventor
Paul Meissner,
by John Wedderburn
Attorney

UNITED STATES PATENT OFFICE.

PAUL MEISSNER, OF GLENVILLE, MARYLAND.

SUSPENDING DEVICE FOR HORSE-BOOTS, &c.

SPECIFICATION forming part of Letters Patent No. 601,974, dated April 5, 1898.

Application filed July 26, 1897. Serial No. 645,935. (No model.)

*To all whom it may concern:*

Be it known that I, PAUL MEISSNER, of Glenville, in the county of Harford and State of Maryland, have invented certain new and useful Improvements in Soaking-Boots for Horses; and I do hereby declare the following to be a full, clear, and exact description of the invention, such as will enable others skilled in the art to which it appertains to make and use the same.

My invention relates to new and useful improvements in suspenders for boots for soaking horses' feet.

The invention has primarily for its object to provide a device of this character whereby boots may be readily applied to and detached from the feet of the animal, and, furthermore, to provide a boot for the purpose suggested that will embody such a construction that not only will the hoof get the beneficial results of soaking, but the knee and lower portions of the legs also.

The invention contemplates the provision of means whereby a boot can be readily adjusted upon the animal and which after adjustment will require no further attendance of the horse until the time for removing the boot or boots.

Another object is to so construct the suspender that the boot will be held centrally below the hoofs and there will be no tendency to tilt or upset.

With these and other objects in view, which will appear in the course of the following description, the invention consists in the novel combination and arrangement of simple parts, that will be hereinafter described.

I am enabled to accomplish the objects of my invention by the simple means illustrated in the accompanying drawings, in which—

Figure 1 represents a view of my device applied. Fig. 2 is a perspective view of the same detached, and Fig. 3 is a central vertical section of one of the boots.

Referring to the drawings, the numeral 1 indicates the boots, which are preferably constructed of canvas or other flexible material and provided with circular bottoms 2, preferably of wood. Surrounding the boot, at the lower ends thereof, are split metallic bands 3, provided with ears 4, perforated, as indicated by the numeral 5, for the passage of bolts or other means, whereby the ends of the bands are drawn together to keep the fabric in close contact with the peripheries of the bottoms of the boot to prevent the same from leaking.

My improved suspender for securing the boots in proper position consists of straps 6, provided with buckles 7, adapted to receive the ends of straps 8, which straps 8 are riveted or otherwise secured to the bracelets 9, adapted to surround the front legs of the horse just below the shoulders and be secured thereon by buckles 10. The bracelet 9, carried by the suspenders, consisting of breast-strap 14 and shoulder-strap 16, is buckled to freely embrace the upper part of the forearm of a horse and furnishes a relatively-fixed support to which the leg of the boot may be connected. Under this arrangement I am enabled to the more perfectly carry out a declared object of my invention. The straps 8 are formed with loops 11 just above the straps 9 for the reception of the buckles 12 and 13, the buckles 12 being adapted to receive the lower ends of the strap 14, which extend around the neck of the horse and through the keeper 15, for the purpose of supporting the forward portions of the boot.

The numeral 16 indicates a strap which extends over the back of the horse just in rear of the shoulders, and the lower ends of said strap are secured in the buckles 13. I preferably provide a keeper 17, through which the straps 14 and 16 extend for the purpose of keeping them in the proper position.

From the foregoing description it will be observed that the device herein described is especially simple in construction and that the objects of the invention are effectually accomplished.

I do not desire to be understood to limit myself to the precise construction shown in the drawings, as modifications may suggest themselves without departing from the spirit of the invention.

Having thus described my invention, what I claim as new, and desire to secure by Letters Patent, is—

The combination of horse-boots and a suspender for holding the boots in proper adjustment, consisting of a strap extending over the back, a neck-strap, bracelets or straps 9 adapted to be applied to the forearm of a horse suspended by said straps, and means for connecting the bracelet with the front and rear edges of the boots, whereby the boots will be held centrally below the hoofs of the horse without tendency to tilt or upset, substantially as described.

In testimony whereof I have signed this specification in the presence of two subscribing witnesses.

PAUL MEISSNER.

Witnesses:
  HARRY CLARK,
  WILLIAM STOTHERS.